United States Patent [19]
Erkens et al.

[11] Patent Number: 5,976,238
[45] Date of Patent: Nov. 2, 1999

[54] BISMUTH VANADATE PIGMENT POWDER MIXTURES

[75] Inventors: Leonardus Johannes Hubertus Erkens, Maastricht; Gregor Schmitt, Landgraaf, both of Netherlands; Hendrikus Maria Anna Hamers, Selfkant, Germany; Johannes Maria Martinus Luijten, Bocholtz; Jozef Gertruda Emanuel Mains, Nieuwstadt, both of Netherlands

[73] Assignee: Ciba Specialty Chemicals Corporation, Tarrytown, N.Y.

[21] Appl. No.: 08/876,551

[22] Filed: Jun. 16, 1997

[30] Foreign Application Priority Data

Jun. 17, 1996 [CH] Switzerland ............... 1509/96

[51] Int. Cl.⁶ ................. C09C 1/00; C09C 3/08
[52] U.S. Cl. ............ 106/479; 106/493; 106/494; 524/408
[58] Field of Search ................. 106/479, 494, 106/493; 524/408

[56] References Cited

U.S. PATENT DOCUMENTS

| | | | |
|---|---|---|---|
| 3,843,554 | 10/1974 | Aykan et al. | 252/468 |
| 4,115,142 | 9/1978 | Hoss | 106/461 |
| 4,937,063 | 6/1990 | Sullivan | 423/593 |
| 5,399,197 | 3/1995 | Vermoortele et al. | 106/479 |

FOREIGN PATENT DOCUMENTS

| | | |
|---|---|---|
| 0212361 | 3/1987 | European Pat. Off. |
| 0304399 | 2/1989 | European Pat. Off. |
| 9211205 | 7/1992 | WIPO |

OTHER PUBLICATIONS

Derwent Abst. 87–051254/08 for EP 0212361 (Mar. 1987).
Chem Abst. 112:20653h (1988) No Month.
Buxbaum, Industrial Inorganic Pigments, p. 114, 1993, (No Month).
Bull. of Bismuth Inst., 68, 1995, (No Month).
Würth, XIX Fatipec Congr., 1988, pp. 48–65, (No Month).
Chemical Abstract No. 112:181444, abstract of an article by Ott et al entitled "Particle Size distribution of organic pigments in water–based printing inks", Fatipec–Kongr., vol. 11 (19th), 191–215, 1988 No Month.
Chemical Abstract No. 128:245207, abstract of an article by Vlym entitled High performance pigments for outdoor powder coatings, Pitture Vernici Eur., 74(1), 56, 58–60, 1988 No Month.
Japio Patent Abstract No. JP410072555A, abstract of Japanese Patent Specifications No. 10–72555, Mar. 1998.
WPIDS Abstract No. 90–323401, abstract of Japanese Patent Specification No. 02–229281, Sep. 1990.

*Primary Examiner*—Anthony Green
*Attorney, Agent, or Firm*—Luther A.R. Hall; Jacob M. Levine

[57] ABSTRACT

Pigment powder mixtures, consisting of 0.999–0.5 part of C.I. Pigment Yellow 184, and 0.001–0.5 part of an organic pigment selected from the group consisting of C.I. Pigment Orange 13, C.I. Pigment Orange 34, C.I. Pigment Orange 36, C.I. Pigment Orange 73, C.I. Pigment Red 170, C.I. Pigment Red 254, C.I. Pigment Red 255 and C.I. Pigment Red 264, or of 0.99–0.5 part of C.I. Pigment Yellow 184, and 0.01–0.5 part of an organic pigment selected from the group consisting of C.I. Pigment Yellow 83, C.I. Pigment Yellow 110 and C.I. Pigment Yellow 139.

These pigment powder mixtures are distinguished, in particular in paints, by very high chroma.

11 Claims, No Drawings

BISMUTH VANADATE PIGMENT POWDER MIXTURES

The present invention relates to pigment powder mixtures consisting of bismuth vanadate pigments and organic pigments and to their use for the preparation of coloured paints and plastic materials having high chroma.

Bismuth vanadates have been known for a long time, and the possibility of using them as pigments was recognised in the seventies, as emerges from G. Buxbaum, Industrial Inorganic pigments, VCH-Verlag (1993) and, inter alia, from U.S. Pat. Nos. 3,843,554 and 4,115,142. They are highly valued in particular because of their low toxicity and their good coloristic properties. The composition of the commercially available bismuth vanadate pigments called C.I. Pigment Yellow 184 can differ very much and spans a range from e.g. pure $BiVO_4$ to the mixed phase pigment $4BiVO_4 \times 3Bi_2MoO_4$ (see The Bulletin of the Bismuth Institute 68, 1995). Bi and V may also be partially replaced with other metals or nonmetals, such as Li, Mg, Zn, Al and, preferably, Ca, and also with W and, preferably, P and Mo.

The above-mentioned article in Bulletin of the Bismuth Institute shows that the combination of bismuth vanadate pigment with organic pigments (perylene, phthalocyanine, and the like) is a good basis for pigments having high chroma. This was also postulated by H. Würth at the XIX FATIPEC Congress 1988 (Aachen), based on tests in paint systems with mixtures of C.I. Pigment Yellow 184 and C.I. Pigment Yellow 139.

However, it must be noted that the paint industry usually produces such combinations by mixing paints, i.e. the bismuth vanadate pigment and the organic pigment are each incorporated in a paint and the two paints are then mixed with each other in the desired ratio.

Surprisingly, it has now been found that mixing the bismuth vanadate pigment with the organic pigment in powder form and incorporating this powder mixture in the paint or also in plastic materials enhances the chroma even more markedly. Pigment powder mixtures of this type are novel.

Accordingly, this invention relates to a pigment powder mixture consisting of 0.999–0.5 part of C.I. Pigment Yellow 184, and 0.001–0.5 part of an organic pigment selected from the group consisting of C.I. Pigment Orange 13, C.I. Pigment Orange 34, C.I. Pigment Orange 36, C.I. Pigment Orange 73, C.I. Pigment Red 170, C.I. Pigment Red 254, C.I. Pigment Red 255 and C.I. Pigment Red 264, or of 0.99–0.5 part of C.I. Pigment Yellow 184, and 0.01–0.5 part of an organic pigment selected from the group consisting of C.I. Pigment Yellow 83, C.I. Pigment Yellow 110 and C.I. Pigment Yellow 139.

Particularly interesting pigment powder mixtures are those containing as organic pigment C.I. Pigment Orange 13, C.I. Pigment Orange 34, C.I. Pigment Orange 36, C.I. Pigment Orange 73, C.I. Pigment Red 170, C.I. Pigment Red 254, C.I. Pigment Red 255 and C.I. Pigment Red 264 or C.I. Pigment Yellow 83.

Preferred pigment powder mixtures are those consisting of 0.85–0.75 part of C.I. Pigment Yellow 184, and 0.15–0.25 part of an organic pigment selected from the group consisting of C.I. Pigment Orange 73, C.I. Pigment Red 254 and C.I. Pigment Red 264.

The preferred organic pigment is C.I. Pigment Orange 73.

The pigment powder mixtures of this invention are prepared by mixing the two pigments in powder form by customary methods.

As mentioned above, the novel pigment powder mixtures allow the preparation of coloured high molecular weight organic materials having particularly high chroma.

Accordingly, this invention also relates to a process for the preparation of coloured high molecular weight organic materials by incorporating therein a pigment powder mixture of the above composition by commonly known methods.

High molecular weight organic materials which can be pigmented with the novel bismuth vanadate pigment powder mixtures are, for example, cellulose ethers and cellulose esters, typically ethyl cellulose, nitrocellulose, cellulose acetate and cellulose butyrate, natural resins and synthetic resins, such as polymerisation resins or condensation resins, e.g. aminoplasts, preferably urea/formaldehyde resins and melamine/formaldehyde resins, alkyd resins, phenoplasts, polycarbonates, polyolefins, such as polyethylene and polypropylene, polystyrene, polyvinyl chloride, polyacrylonitrile, polyacrylate, polyamides, polyurethanes, polyesters, rubber, casein, silicone and silicone resins, singly or in admixture.

It is irrelevant whether the above high molecular weight organic compounds are obtained as plastic materials, melts or in the form of spinning solutions, paints, coating materials or printing inks. Depending on their envisaged end use, it is advantageous to use the novel bismuth vanadate pigment powder mixtures as toners or in the form of preparations. The novel bismuth vanadate pigment powder mixtures may be used in an amount of 0.01 to 75% by weight, preferably of 0.1 to 50% by weight, based on the high molecular weight organic material to be pigmented.

The novel pigment powder mixtures are particularly suitable for pigmenting plastic materials, typically polyolefins, such as polyethylene and polypropylene, or poly vinyl chloride, fluoropolymers, such as polyfluoroethylene, polytrifluorochloroethylene or tetrafluoroethylene/hexafluoropropylene mixed polymers, silicone resins or also engineering plastics, such as polycarbonates, polyacrylates, polymethacrylates, polystyrene, ABS, polyester, in particular polyalkylene terephthalates, such as polybutylene terephthalate (PBT) or polyethylene terephthalate (PET), polyamides, polyether ketones, poly urethanes, singly or in admixture.

Colouring is carried out by conventional methods, typically by mixing the pigment powder mixture with the plastic granulate or plastic powder and extruding the mixture to fibres, films or granulates. The granulates can then, for example, be moulded by the injection moulding process to moulded articles.

However, the novel pigment powder mixtures are preferably used for colouring paints. Said paints are preferably paints based on acrylic resins, alkyd resins, epoxy resins, phenolic resins, melamine resins, urea resins, polyester resins, polyurethane resins, isocyanate resins, benzoguanamine resins or cellulose ester resins. Very particularly preferred paints are those based on acrylic/melamine resins, alkyd/melamine resins or thermoplastic acrylic resins, and also aqueous paints systems.

For pigmenting paints, the high molecular weight organic materials and the novel pigment powder mixtures, together with optional additives such as fillers, other pigments, siccatives or plasticisers, are finely dispersed or dissolved in a common organic solvent or solvent mixture.

The resultant colorations in paints as well as in plastic materials are distinguished by good allround fastness properties, such as fastness to migration, heat, light, weather, re-coating, by high tinting strength and, in particular, by their surprisingly high chroma.

The following Examples illustrate the invention in more detail.

EXAMPLE 1 a) 90.91 g of C.I. Pigment Yellow 184 (®IRGACOLOR Yellow 14247, Ciba) are mixed with 9.09 g of C.I. Pigment Orange 73 and ground in a Coulatti No.1 type laboratory mill with screen pack (Ø=1.0 mm). The pigment mixture so obtained is applied in an AM paint by the following procedure:

b) 37.0 g of an alkyd/melamine paint of the following composition:

| | |
|---|---|
| 18.7 g | of a short-chain alkyd resin (®SETAL 84xx70 (70%), supplied by Synthese) |
| 7.2 g | of a melamine resin (®SETAMIN US 132 BB7O (70%), supplied by Synthese) |
| 7.8 g | of Solvesso 100 (aromatic hydrocarbons) |
| 1.7 g | of butanol |
| 0.8 g | of Depanol J (terpene hydrocarbon) |
| 0.8 g | of isophorone, | are placed together with 10.3 g of the pigment mixture according to Example 1 a) and 40 g of glass beads (diameter 3 mm) in a 100 ml glass vessel with screw cap and are dispersed in a Scandex apparatus until a degree of fineness of <10 μ (Hegman gage) is reached.

The paint is drawn on a contrast panel (wet film thickness 75 μm), flashed off for 20 minutes and then stoved for 30 minutes at 130° C.

The colorations so obtained have excellent chroma.

EXAMPLE 2 a) 80.0 g of C.I. Pigment Yellow 184 (®IRGACOLOR Yellow 14247, Ciba) are mixed with 20.0 g of C.I. Pigment Orange 73 and are ground in a Coulatti No.1 type laboratory mill with screen pack (Ø=1.0 mm). The pigment mixture so obtained is applied in an AM paint by the following procedure:

b) 37.0 g of an alkyd/melamine paint of the following composition:

| | |
|---|---|
| 18.7 g | of a short-chain alkyd resin (®SETAL 84xx70 (70%), supplied by Synthese) |
| 7.2 g | of a melamine resin (®SETAMIN US 132 BB7O (70%), supplied by Synthese) |
| 7.8 g | of Solvesso 100 |
| 1.7 g | of butanol |
| 0.8 g | of Depanol J |
| 0.8 g | of isophorone, | are placed together with 9.6 g of the pigment mixture according to Example 2a) and 40 g of glass beads (diameter 3 mm) in a 100 ml glass vessel with screw cap and are dispersed in a Scandex apparatus until a degree of fineness of <10 μm (Hegman gage) is reached.

The paint is drawn on a contrast panel (wet film thickness 75 μm), flashed off for 20 minutes and then stoved for 30 minutes at 1300° C.

The colorations so obtained have excellent chroma.

EXAMPLE 3 a) 99.21 g of C.I. Pigment Yellow 184 (®IRGACOLOR Yellow 14247, Ciba) are mixed with 0.79 g of C.I. Pigment Red 255 (®IRGAZIN DPP Scarlet EK, Ciba) and are ground in a Coulatti No.1 type laboratory mill equipped with screen pack (Ø=1.0 mm). The pigment mixture so obtained is applied in an AM paint by the following procedure:

b) 37.0 g of an alkyd/melamine paint of the following composition:

| | |
|---|---|
| 18.7 g | of a short-chain alkyd resin (®SETAL 84xx70 (70%), supplied by Synthese) |
| 7.2 g | of a melamine resin (®SETAMIN US 132 BB7O (70%), supplied by Synthese) |
| 7.8 g | of Solvesso 100 |
| 1.7 g | of butanol |
| 0.8 g | of Depanol J |
| 0.8 g | of isophorone, | are placed together with 10.9 g of the pigment mixture according to Example 3a) and 40 g of glass beads (diameter 3 mm) in a 100 ml glass vessel with screw cap and are dispersed in a Scandex apparatus until a degree of fineness of <10 μm (Hegman gage) is reached.

The paint is drawn on a contrast panel (wet film thickness 75 μm), flashed off for 20 minutes and then stoved for 30 minutes at 1300° C.

The colorations so obtained have excellent chroma.

EXAMPLE 4 a) 94.53 g of C.I. Pigment Yellow 184 (®IRGACOLOR Yellow 14247, Ciba) are mixed with 5.47 g of C.I. Pigment Red 255 (®IRGAZIN DPP Scarlet EK, Ciba) and ground in a Coulatti No.1 type laboratory mill with screen pack (Ø=1.0 mm). The pigment mixture so obtained is applied in an AM paint by the following procedure:

b) 37.0 g of an alkyd/melamine paint of the following composition:

| | |
|---|---|
| 18.7 g | of a short-chain alkyd resin (®SETAL 84xx70 (70%), supplied by Synthese) |
| 7.2 g | of a melamine resin (®SETAMIN US 132 BB7O (70%), supplied by Synthese) |
| 7.8 g | of Solvesso 100 |
| 1.7 g | of butanol |
| 0.8 g | of Depanol J |
| 0.8 g | of isophorone, | are placed together with 10.6 g of the pigment mixture according to Example 4a) and 40 g of glass beads (diameter 3 mm) in a 100 ml glass vessel with screw cap and are dispersed in a Scandex apparatus until a degree of fineness of <10 μm (Hegman gage) is reached.

The paint is drawn on a contrast panel (wet film thickness 75 μm), flashed off for 20 minutes and then stoved for 30 minutes at 130° C.

The colorations so obtained have excellent chroma.

EXAMPLE 5 a) 96.23 g of C.I. Pigment Yellow 184 (®IRGACOLOR Yellow 14247, Ciba) are mixed with 3.77 g of C.I. Pigment Yellow 110 (®IRGAZIN Yellow 2RLT, Ciba) and ground in a Coulatti No.1 type laboratory mill with screen pack (Ø=1.0 mm). The pigment mixture so obtained is applied in an AM paint by the following procedure:

b) 37.0 g of an alkyd/melamine paint of the following composition:

| | |
|---|---|
| 18.7 g | of a short-chain alkyd resin (®SETAL 84xx70 (70%), supplied by Synthese) |
| 7.2 g | of a melamine resin (®SETAMIN US 132 BB7O (70%), supplied by Synthese) |
| 7.8 g | of Solvesso 100 |
| 1.7 g | of butanol |
| 0.8 g | of Depanol J |
| 0.8 g | isophorone, | are placed together with 10.7 g of the pigment mixture according to Example 5a) and 40 g of glass beads (diameter 3 mm) in a 100 ml glass vessel with screw cap and dispersed in a Scandex apparatus until a degree of fineness of <10 μm (Hegman gage) is reached.

The paint is drawn on a contrast panel (wet film thickness 75 μm), flashed off for 20 minutes and then stoved for 30 minutes at 130° C.

The colorations so obtained have excellent chroma.

EXAMPLE 6 a) 90.0 g of C.I. Pigment Yellow 184 (®IRGACOLOR Yellow 14247, Ciba) are mixed with 10.0 g of C.I. Pigment Yellow 110 (®IRGAZIN Yellow 2RLT, Ciba) and ground in a Coulatti No.1 type laboratory mill with screen pack (Ø=1.0 mm): The pigment mixture so obtained is applied in an AM paint by the following procedure:

b) 37.0 g of an alkyd/melamine paint of the following composition:

| | |
|---|---|
| 18.7 g | of a short-chain alkyd resin (®SETAL 84xx70 (70%), supplied by Synthese) |
| 7.2 g | of a melamine resin (®SETAMIN US 132 BB7O (70%), supplied by Synthese) |
| 7.8 g | of Solvesso 100 |
| 1.7 g | of butanol |
| 0.8 g | of Depanol J |
| 0.8 g | of isophorone, | are placed together with 10.3 g of the pigment mixture according to Example 6a) and 40 g of glass beads (diameter 3 mm) in a 100 ml glass vessel with screw cap and dispersed in a Scandex apparatus until a degree of fineness of <10 μm (Hegman gage) is reached.

The paint is drawn on a contrast panel (wet film thickness 75 μm), flashed off for 20 minutes and then stoved for 30 minutes at 130° C.

The colorations so obtained have excellent chroma.

What is claimed is:

1. A pigment powder mixture, consisting of
   0.999–0.5 part of C.I. Pigment Yellow 184, and
   0.001–0.5 part of an organic pigment selected from the group consisting of C.I. Pigment Orange 13, C.I. Pigment Orange 34, C.I. Pigment Orange 36, C.I. Pigment Orange 73, C.I. Pigment Red 170, C.I. Pigment Red 254, C.I. Pigment Red 255 and C.I. Pigment Red 264,
or of
   0.99–0.5 part of C.I. Pigment Yellow 184, and
   0.01–0.5 part of an organic pigment selected from the group consisting of C.I. Pigment Yellow 83, C.I. Pigment Yellow 110 and C.I. Pigment Yellow 139.

2. A pigment powder mixture consisting of
   0.999–0.5 part of C.I. Pigment Yellow 184, and
   0.001–0.5 part of an organic pigment wherein the organic pigment is C.I. Pigment Orange 13, C.I. Pigment Orange 34, C.I. Pigment Orange 36, C.I. Pigment Orange 73, C.I. Pigment Red 170, C.I. Pigment Red 254, C.I. Pigment Red 255 or C.I. Pigment Red 264,
or of
   0.99–0.5 part of C.I. Pigment Yellow 184, and
   0.01–0.5 Darts of an organic Digment wherein the organic Digment is C.I. Pigment Yellow 83.

3. A pigment powder mixture, consisting of
   0.85–0.75 part of C.I. Pigment Yellow 184, and
   0.15–0.25 part of an organic pigment selected from the group consisting of C.I. Pigment Orange 73, C.I. Pigment Red 254 and C.I. Pigment Red 264.

4. A pigment powder mixture according to claim 3, wherein the organic pigment is C.I. Pigment Orange 73.

5. A process for the preparation of coloured high molecular weight organic materials by incorporating therein a pigment powder mixture according to claim 1 in an amount effective to provide colour to said high molecular weight organic material.

6. A process according to claim 5, wherein the high molecular weight organic material is a plastic material.

7. A process according to claim 6, wherein the plastic material is selected from the group consisting of polyolefins, polyvinyl chloride, fluoropolymers, silicone resins, polycarbonates polyacrylates, polymethacrylates, polystyrene, ABS copolymer, polyesters, polyamides, polyether ketones, polyurethanes and mixtures thereof.

8. A process according to claim 5, wherein the high molecular weight organic material is a paint.

9. A process according to claim 8, wherein the paint is based on acrylic resins, alkyd resins, epoxy resins, phenolic resins, melamine resins, urea resins, polyester resins, polyurethane resins, isocyanate resins, benzoguanamine resins or cellulose ester resins, or is an aqueous paint system.

10. A process according to claim 8, wherein the paint is based on acrylic/melamine resins, alkyd/melamine resins or thermoplastic acrylic resins, or is an aqueous paint system.

11. A pigment powder mixture consisting of
    0.99–0.5 part of C.I. Pigment Yellow 184, and
    0.01–0.5 parts of an organic pigment wherein the organic pigment is C.I. Pigment Yellow 139.

* * * * *